(12) United States Patent
Maehara

(10) Patent No.: US 9,573,620 B2
(45) Date of Patent: Feb. 21, 2017

(54) APPARATUS AND METHOD FOR ADJUSTING ELECTRIC POWER STEERING DEVICE

(75) Inventor: Hideo Maehara, Kani (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 13/704,685

(22) PCT Filed: Nov. 4, 2011

(86) PCT No.: PCT/JP2011/075437
§ 371 (c)(1),
(2), (4) Date: Dec. 17, 2012

(87) PCT Pub. No.: WO2012/066942
PCT Pub. Date: May 24, 2012

(65) Prior Publication Data
US 2013/0090811 A1  Apr. 11, 2013

(30) Foreign Application Priority Data
Nov. 18, 2010  (JP) ................................. 2010-258093

(51) Int. Cl.
*B62D 6/08* (2006.01)
*B62D 6/00* (2006.01)
*B62D 6/10* (2006.01)

(52) U.S. Cl.
CPC .................. *B62D 6/08* (2013.01); *B62D 6/008* (2013.01); *B62D 6/10* (2013.01)

(58) Field of Classification Search
CPC ........... B62D 5/00; B62D 5/001; B62D 5/004; G01L 3/101; G01L 5/221
See application file for complete search history.

(56) References Cited

U.S. PATENT DOCUMENTS 4,753,308 A * 6/1988 Noto et al. ..................... 180/446
6,360,841 B1 * 3/2002 Blandino ................ G01L 5/221
 180/443
(Continued)

FOREIGN PATENT DOCUMENTS

JP   2001-138938 A   5/2001
JP   2006-056475 A   3/2006
(Continued)

OTHER PUBLICATIONS

International Search Report and Written Opinion corresponding to PCT/JP2011/075437, dated Feb. 7, 2012.

*Primary Examiner* — Rami Khatib
*Assistant Examiner* — Nicholas K Wiltey
(74) *Attorney, Agent, or Firm* — Hauptman Ham, LLP

(57) ABSTRACT

An adjusting apparatus for an electric power steering device includes a steering mechanism converting an input torque into a steering force and transmitting the steering force to wheels, a torque sensor outputting a torque detection signal according to an input torque, an electric motor applying a steering assist torque according to a torque detection signal output from the sensor, a sensor circuit changing output characteristics of the sensor, an actuator applying an input torque to the steering mechanism, a steering force meter actuating the motor via the sensor according to an input torque and measuring a steering force output by the steering mechanism, and a sensor output adjuster adjusting the output characteristic of the sensor circuit to approximate a steering force measured by the meter to an ideal value set in advance according to a deviation amount calculated based on a difference between the steering force and the ideal value.

11 Claims, 10 Drawing Sheets

(56) References Cited

U.S. PATENT DOCUMENTS

| | | | |
|---|---|---|---|
| 7,987,734 B2 | 8/2011 | Maehara | |
| 2004/0159489 A1* | 8/2004 | Toda et al. | 180/446 |
| 2005/0151569 A1* | 7/2005 | Osamura | 327/108 |
| 2005/0224277 A1* | 10/2005 | Kato et al. | 180/422 |
| 2005/0264248 A1* | 12/2005 | Tsunoda | 318/434 |
| 2006/0060412 A1* | 3/2006 | Bolourchi et al. | 180/443 |
| 2006/0123925 A1* | 6/2006 | Paek | 73/862.193 |
| 2006/0123926 A1* | 6/2006 | Paek | 73/862.326 |
| 2006/0266575 A1* | 11/2006 | Nagase et al. | 180/446 |
| 2007/0289806 A1* | 12/2007 | Matsuda | B62D 3/12 180/444 |
| 2008/0053250 A1* | 3/2008 | Yoneda et al. | 73/862.333 |
| 2008/0243399 A1 | 10/2008 | Obata | |
| 2010/0017064 A1* | 1/2010 | Kojima | B62D 5/0463 701/42 |

FOREIGN PATENT DOCUMENTS

| | | |
|---|---|---|
| JP | 2008-232724 A | 10/2008 |
| JP | 2008-238946 A | 10/2008 |
| JP | 2009-244205 A | 10/2009 |
| JP | 2010-002382 A | 1/2010 |
| WO | 2008123292 A1 | 10/2008 |

\* cited by examiner

APPARATUS AND METHOD FOR ADJUSTING ELECTRIC POWER STEERING DEVICE

RELATED APPLICATIONS

The present application is National Phase of International Application Number PCT/JP2011/075437, and claims priority from Japanese Application Number 2010-258093, filed Nov. 18, 2010.

TECHNICAL FIELD

The present invention relates to an apparatus and a method for adjusting an electric power steering device in which an electric motor applies a steering assist torque to a steering mechanism of a vehicle.

BACKGROUND ART

JP2010-2382A discloses an electric power steering device. An electric power steering device of this type is configured so that an output of an electric motor is controlled according to an input torque detected by a torque sensor and the electric motor applies a predetermined steering assist torque.

At the time of manufacturing a torque sensor, an output adjustment is made to correct an output signal of the torque sensor in response to an input torque in an output sensor output adjustment process after the assembling of the torque sensor is completed in an assembling process, whereby an output variation among torque sensor products is suppressed.

SUMMARY OF THE INVENTION

However, in the electric power steering device in which the torque sensor, the electric motor and the steering mechanism are unitized, even if the output of the torque sensor is adjusted in the output sensor output adjustment process, a variation of an output characteristic of the electric motor, variations of friction characteristic and the like of the steering mechanism are not solved. Thus, a steering force variation among electric power steering device products cannot be suppressed.

The present invention aims to provide an apparatus and a method for adjusting an electric power steering device, the apparatus and the method being capable of suppressing a steering force variation among products.

According to one aspect of the present invention, an adjusting apparatus for an electric power steering device is provided which comprises a steering mechanism which converts an input torque into a steering force and transmits the steering force to wheels; a torque sensor which outputs a torque detection signal according to an input torque; an electric motor which applies a steering assist torque according to a torque detection signal output from the torque sensor; a sensor circuit which is capable of changing output characteristics of the torque sensor; an actuator which applies an input torque to the steering mechanism; a steering force meter which actuates the electric motor via the torque sensor according to an input torque and measures a steering force output by the steering mechanism; and a sensor output adjuster which adjusts the output characteristic of the sensor circuit to approximate a steering force measured by the steering force meter to an ideal value set in advance according to a deviation amount calculated based on a difference between the steering force and the ideal value.

According to another aspect of the present invention, an adjusting method for an electric power steering device is provided which comprises a steering mechanism which converts an input torque into a steering force and transmits the steering force to wheels; a torque sensor which outputs a torque detection signal according to an input torque; an electric motor which applies a steering assist torque according to a torque detection signal output from the torque sensor; and a sensor circuit which is capable of changing output characteristics of the torque sensor, the adjusting method comprises successively performing: a steering force measurement process of actuating the electric motor via the torque sensor according to an input torque and measuring a steering force output by the steering mechanism; a sensor output calculation process of calculating a difference between a measured steering force and an ideal value set in advance as a deviation amount; and a sensor output adjustment process of adjusting the output characteristic of the sensor circuit to approximate the steering force to the ideal value according to the calculated deviation amount.

Embodiments of the present invention and advantages thereof are described in detail below with reference to the accompanying drawings.

EMBODIMENTS OF THE INVENTION

Figure 1:
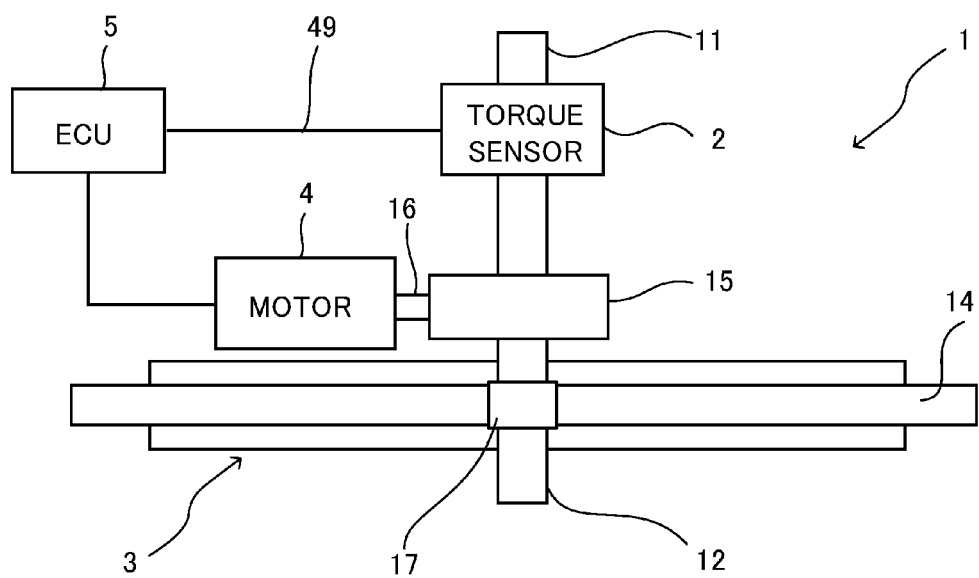
FIG. 1 is a schematic configuration diagram of an electric power steering device according to an embodiment of the present invention.

FIG. 1 shows an example of an electric power steering device of a vehicle to which this embodiment is applied. This electric power steering device 1 includes a steering mechanism 3, a torque sensor 2, an electric motor 4 and a controller (ECU) 5. The steering mechanism 3 steers wheels in association of a steering wheel. The torque sensor 2 detects an input torque. The electric motor 4 applies a steering assist torque to the steering mechanism 3. A detection signal of the torque sensor 2 is input to the controller 5, which controls an output of the electric motor 4.

The steering mechanism 3 steers the wheels via a tie rod (not shown) and the like coupled to a rack 14 by moving the rack 14 engaged with a pinion 17 formed on an output shaft 12 in an axial direction (lateral direction of the vehicle) by the rotation of an input shaft 11 and an output shaft 12 linked with the steering wheel.

The steering mechanism 3 includes a worn wheel 15 coupled to the output shaft 12 and a worm 16 engaged with this worm wheel 15. The electric motor 4 drives and rotates the worm 16 and applies a steering assist torque to the output shaft 12 via the worn in wheel 15.

The torque sensor 2 is interposed between the input shaft 11 and the output shaft 12 and detects an input torque applied to the input shaft 11 via the steering wheel by a driver.

Figure 2:
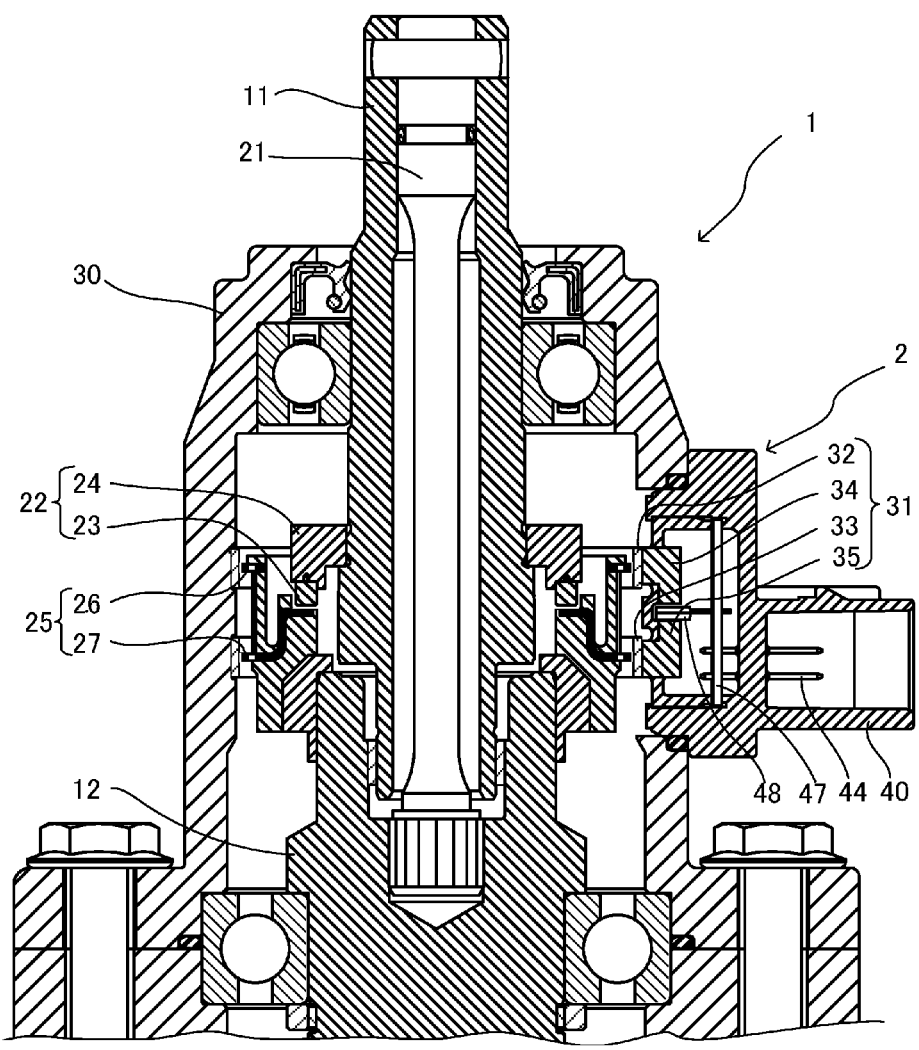
FIG. 2 is a sectional view of a torque sensor of the electric power steering device according to the embodiment of the present invention.

FIG. 2 is a sectional view of the torque sensor 2. The torque sensor 2 is composed of a torsion bar 21, a magnetic generation unit 22, a rotating magnetic circuit unit (multipolar yoke) 25, a fixed magnetic circuit unit 31 and magnetic sensors 48. The torsion bar 21 is interposed between the input shaft 11 and the output shaft 12. The magnetic generation unit 22 rotates together with the input shaft 11. The rotating magnetic circuit unit 25 rotates together with the output shaft 12. The fixed magnetic circuit unit 31 is fixedly provided in a housing 30. The magnetic sensors 48 detect a density of magnetic flux guided to the fixed magnetic circuit unit 31. The non-contact type torque sensor 2 detects a torsion angle of the torsion bar 21 according to a magnetic flux density which varies according to a torsional deformation of the torsion bar 21 without being held in contact with the input shaft 11 and the output shaft 12.

The magnetic generation unit 22 includes a back yoke (heel piece) 24 fixed to the input shaft 11 and a cylindrical ring magnet 23 (multipolar magnet) fixed to this back yoke 24.

The ring magnet 23 produces magnetism in a rotational axis direction of the input shaft 11 and the torsion bar 21.

For example, twelve magnetic poles are formed at equal intervals in a circumferential direction on each of the upper and lower end surfaces of the cylindrical ring magnet 23, wherein six N poles and six S poles are alternately arranged.

The rotating magnetic circuit unit 25 includes a first soft magnetic ring 26 and a second soft magnetic ring 27 for guiding magnetic flux of the ring magnet 23.

Each of the first and second soft magnetic rings 26, 27 includes six magnetic path leading ends facing the lower end surface (magnetic pole surface) of the ring magnet 23, six magnetic path columns bent at the magnetic path leading ends and extending in directions away from each other, and a magnetic path ring annularly extending while connecting these magnetic path columns, and these are integrally formed by press working.

The structures of the first and second soft magnetic rings 26, 27 are proposed by the present applicant in JP2009-244205A.

The fixed magnetic circuit unit 31 includes a first magnetic collecting ring 32 and a second magnetic collecting ring 33 fixed to the housing 30 and a first magnetic collecting yoke 34 and a second magnetic collecting yoke 35 fixed to a sensor holder 40.

The ring-shaped first and second magnetic collecting rings 32, 33 are arranged so that the inner peripheral surfaces thereof face the magnetic path rings of the first and second soft magnetic rings 26, 27.

The block-shaped first and second magnetic collecting yokes 34, 35 are arranged to face the outer peripheral surfaces of the first and second magnetic collecting rings 32, 33. A pair of magnetic gaps (clearances) are formed between the first and second magnetic collecting yokes 34, 35, and two main and auxiliary magnetic sensors 48 are disposed side by side in this magnetic gap. Each magnetic sensor 48 is fixed to the sensor holder 40 via a resin molding.

Torque detection signals of the magnetic sensors 48 are taken out via a substrate 47 and terminals 44. The terminals 44 are connected to the controller 5 via wires 49 connected to the sensor holder 40.

Next, how the torque sensor 2 detects an input torque acting on the input shaft 11 is described.

In a neutral state where a torque is not acting on the input shaft 11, the magnetic path leading ends of the first and second soft magnetic rings 26, 27 respectively face the N poles and S poles of the ring magnet 23 with the same area to magnetically short the both, wherefore magnetic flux is not guided to the rotating magnetic circuit unit 25 and the fixed magnetic circuit unit 31.

When the driver operates the steering wheel and an input torque acts on the input shaft 11 in one direction, the torsion bar 21 is torsionally deform fired according to the direction of this input torque. The first magnetic path leading ends of the first soft magnetic ring 26 face the N and S poles with larger areas for the S poles than for the N poles, whereas the second magnetic path leading ends of the second soft magnetic ring 27 face the N and S poles with larger areas for the N poles than for the S poles. The magnetic flux from the ring magnet 23 is guided to the rotating magnetic circuit unit 25 and the fixed magnetic circuit unit 31 and signals corresponding to the intensity and direction of a magnetic field are output from the magnetic sensors 48. A magnetic path in the rotating magnetic circuit unit 25 and the fixed magnetic circuit unit 31 to which this magnetic flux is guided is: N poles→first soft magnetic ring 26→first magnetic collecting ring 32→first magnetic collecting yoke 34→magnetic sensors 48→second magnetic collecting yoke 35→second magnetic collecting ring 33→second soft magnetic ring 27→S poles.

When the driver operates the steering wheel and an input torque acts on the input shaft 11 in an opposite direction, the torsion bar 21 is torsionally deformed in an opposite direction. The first magnetic path leading ends of the first soft magnetic ring 26 face the N and S poles with larger areas for the N poles than for the S poles, whereas the second magnetic path leading ends of the second soft magnetic ring 27 face the N and S poles with larger areas for the S poles than for the N poles. Magnetic flux is guided in a magnetic path opposite to the above-described magnetic path and signals corresponding to the intensity and direction of a magnetic field are output from the magnetic sensors 48. A magnetic path in the rotating magnetic circuit unit 25 and the fixed magnetic circuit unit 31 to which this magnetic flux is guided is: N poles→second soft magnetic ring 27→second magnetic collecting ring 33→second magnetic collecting yoke 35→magnetic sensors 48→first magnetic collecting yoke 34→first magnetic collecting ring 32→first soft magnetic ring 26→S poles.

When the torsion bar 21 is torsionally deformed according to an input torque acting on the input shaft 11 and differences between the areas of the magnetic path leading ends of the first and second soft magnetic rings 26, 27 facing the N poles and the S poles of the ring magnet 23 increase, the density of magnetic flux guided to the magnetic sensors 48 increases and signals corresponding to this torque are output from the magnetic sensors 48.

The magnetic sensor 48 includes a detection element (Hall element) for outputting a voltage corresponding to the magnitude and direction of a magnetic field as an input torque output unit and a sensor circuit (IC) for outputting a torque detection signal according to an output voltage of this detection element.

The sensor circuit of the magnetic sensor 48 includes an amplification unit for amplifying an output voltage of the detection element (output of the input torque output unit) by a set output amplification factor (gain) and an offset value correction unit for adding a set offset value to an amplified output voltage. The sensor circuit outputs a torque detection signal after performing processings of the amplification unit and the offset value correction unit on the output voltage of the detection element. A specific example of the contents of the processings of the amplification unit and the offset value correction unit is described later.

Torque detection signals output from the magnetic sensors 48 are input to the controller 5 as an output of the torque sensor 2. Further, the controller 5 transmits and receives information to and from another controller installed in the vehicle via a communication system installed in the vehicle. Detection signals on various operating conditions including, for example, a speed signal of the vehicle are input to the controller 5, which controls an output of the electric motor 4 based on a map set in advance based on these signals. The electric motor 4 applies a steering assist torque to the steering mechanism 3 corresponding to an input torque and operating conditions such as the vehicle speed.

The controller 5 determines abnormality of each magnetic sensor 48 by comparing output voltages of the two main and auxiliary magnetic sensors 48.

The electric power steering device 1 configured as described above is manufactured with the torque sensor 2, the electric motor 4 and the steering mechanism 3 unitized. If necessary, the device 1 is manufactured with the controller 5 also unitized together with the torque sensor 2, the electric motor 4 and the steering mechanism 3.

In the electric power steering device 1 as a product, constituent elements such as the torque sensor 2, the electric motor 4 and the steering mechanism 3 may possibly vary from product to product.

An adjustment method for suppressing a steering force variation among electric power steering device 1 products is described below.

Figure 3:
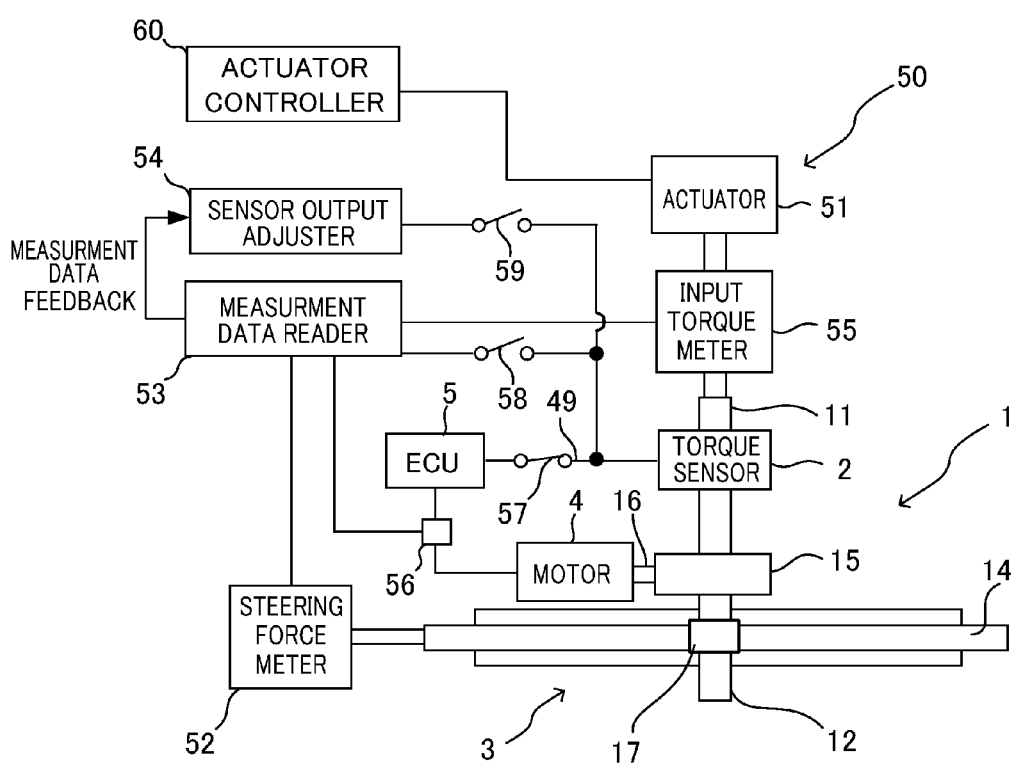
FIG. 3 is a schematic configuration diagram of an adjusting apparatus for the electric power steering device according to the embodiment of the present invention.

FIG. 3 shows a schematic configuration of an adjusting apparatus 50 for adjusting an output of the electric power steering device 1. The adjusting apparatus 50 includes an actuator 51, an actuator controller 60, an input torque meter 55, a steering force meter 52, a measurement data reader 53 and a sensor output adjuster (writing tool) 54.

The actuator 51 applies an input torque to the input shaft 11. The actuator controller 60 actuates the actuator 51. The input torque meter 55 measures an input torque applied to the input shaft 11 by the actuator 51. The steering force meter 52 measures a steering force (rack thrust) applied to the rack 14. The measurement data reader 53 reads measurement data of the input torque meter 55 and the steering force meter 52. The sensor output adjuster 54 adjusts an output of the torque sensor 2 according to the read measurement data.

The adjusting apparatus 50 includes an ammeter 56, a switch 57, a switch 58 and a switch 59. The ammeter 56 measures a motor current output from the controller 5 to the electric motor 4. The switch 57 is disposed in the wire 49 connecting the torque sensor 2 and the controller 5. The switch 58 is disposed in a wire connecting the torque sensor 2 and the measurement data reader 53. The switch 59 is disposed in a wire connecting the torque sensor 2 and the sensor output adjuster 54.

Figure 4:
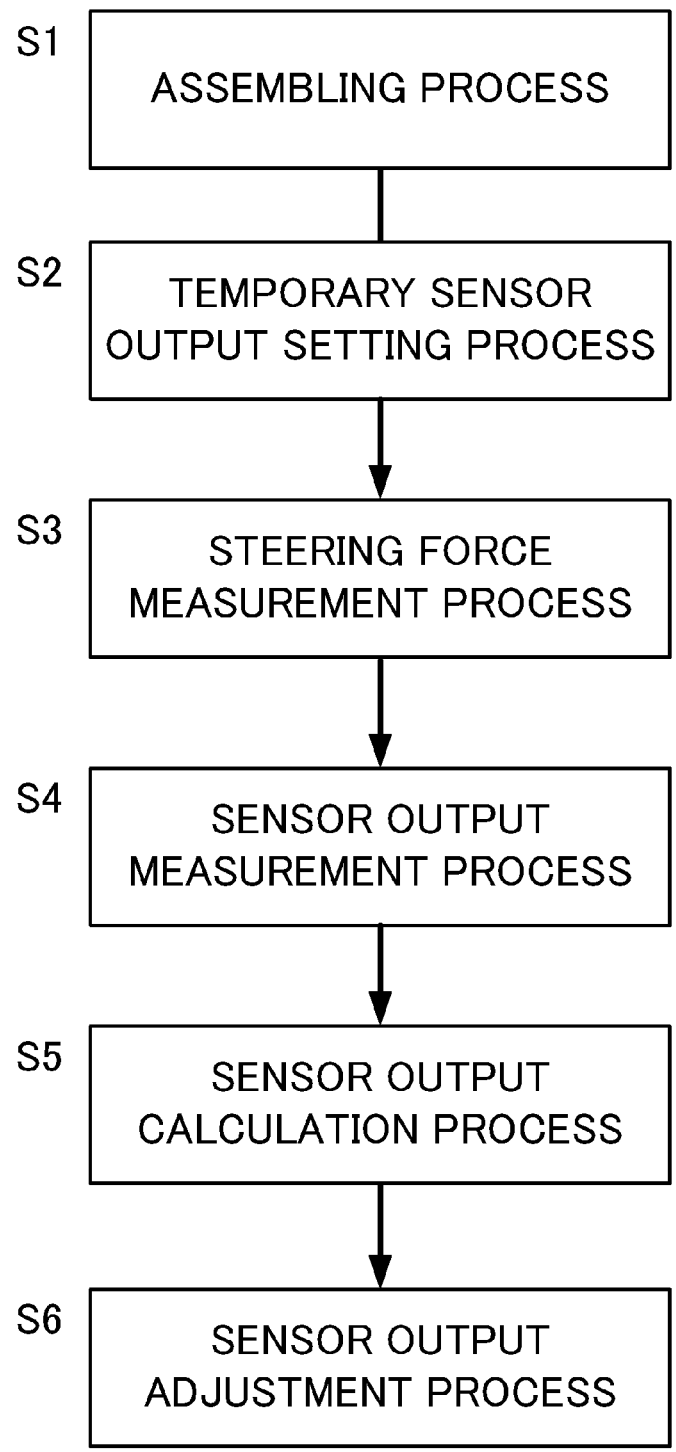
FIG. 4 is a flow chart showing the procedure of a method for adjusting the electric power steering device according to the embodiment of the present invention.

A flow chart of FIG. 4 shows the procedure of adjusting a thrust of the electric power steering device 1 using the adjusting apparatus 50.

In Step S1, an assembling process is performed to assemble the electric power steering device 1, into which each component was assembled, into the adjusting apparatus 50.

In the assembling process, the actuator 51 is coupled to and the input torque meter 55 is attached to the input shaft 11, the steering force meter 52 is coupled to one end of the rack 14, and the measurement data reader 53 and the sensor output adjuster 54 are connected to the torque sensor 2.

In Step S2, a temporary sensor output setting process is performed to set the output amplification factor and the offset value respectively to determined specified values in the sensor circuits of the magnetic sensors 48.

If the output amplification factor and the offset value of the magnetic sensors 48 are set at the predetermined specified values in advance, the temporary sensor output setting process is omitted.

In Step S3, a steering force measurement process is performed to measure a steering force output from the steering mechanism 3 according to an input torque applied by the actuator 51 by the steering force meter 52. Operations performed in this steering force measurement process are described below.

A state where torque detection signals output by the torque sensor 2 are input only to the controller 5 is set by turning the switch 57 on and turning the switches 58, 59 off.

The actuator controller 60 actuates the actuator 51 to apply an input torque, which varies with a predetermined characteristic, to the input shaft 11. Specifically, the actuator 51 rotates the input shaft 11 in one direction (e.g. right turning direction) and rotates the input shaft 11 in an opposite direction (e.g. left turning direction) by applying a continuously varying input torque to the input shaft 11.

Associated with this, the electric power steering device 1 is actuated. Specifically, the torsion bar 21 of the torque sensor 2 is twisted according to the input torque applied by the actuator 51 and the magnetic sensors 48 output torque detection signals corresponding to the input torque. Subsequently, the controller 5 outputs a motor current corresponding to the torque detection signals to the electric motor 4 and the electric motor 4 applies a steering assist torque corresponding to the motor current to the steering mechanism 3.

The measurement data reader 53 reads and stores measurement data of the motor current measured by ammeter 56, that of the input torque measured by the input torque meter 55 and that of the steering force measured by the steering force meter 52.

In Step S4, a sensor output measurement process is performed to measure the torque detection signals output by the torque sensor 2 according to the input torque applied by the actuator 51. Operations performed in this sensor output measurement process are described below.

A state where torque detection signals output by the torque sensor 2 are input only to the measurement data reader 53 is set by turning the switch 58 on and turning the switches 57, 59 off.

The actuator controller 60 actuates the actuator 51 to apply an input torque, which varies with a predetermined characteristic, to the input shaft 11. Specifically, the actuator 51 rotates the input shaft 11 in one direction (e.g. right turning direction) and rotates the input shaft 11 in an opposite direction (e.g. left turning direction) by applying a continuously varying input torque to the input shaft 11.

The measurement data reader 53 reads and stores measurement data of the input torque measured by the input torque meter 55 and that of the steering force measured by the steering force meter 52.

The order of the steering force measurement process in Step S3 and the sensor output measurement process in Step S4 may be reversed, whereby the sensor output measurement process may be performed before the steering force measurement process.

The input torque may be applied to the input shaft 11, for example, by man power without being limited to the configuration that the actuator 51 applies an input torque to the input shaft 11 in the steering force measurement process and the sensor output measurement process.

In Step S5, a sensor output calculation process is performed to calculate a difference between the steering force measured by the steering force meter 52 and an ideal value set in advance as a deviation amount.

A deviation of the steering force occurs due to product variations of the torque sensor 2, the electric motor 4, the steering mechanism 3, the controller 5 and the like constituting the electric power steering device 1.

In Step S6, a sensor output adjustment process is performed to adjust output characteristics of the sensor circuits by the sensor output adjuster 54 to approximate the steering force to the ideal value according to the calculated deviation amount. Specifically, the sensor output adjuster 54 changes the output amplification factor or offset value set in the sensor circuits of the magnetic sensors 48 and causes them to be stored. A state where a signal output by the sensor output adjuster 54 is input only to the torque sensor 2 is set by turning the switch 59 on and turning switches 57, 58 off.

Data of the magnetic sensors 48 obtained in the steering force measurement process, the sensor output measurement process, the sensor output calculation process and the like are recorded by an administrator with an identification number attached for each magnetic sensor 48 and stored in memories provided in the sensor circuits of the magnetic sensors 48. The data of the magnetic sensors 48 recorded in this way are used for an output adjustment made at the time of replacing the magnetic sensors 48.

A specific example of adjusting the output characteristic of the sensor circuit of the magnetic sensor 48 is described below.

Figure 5A:
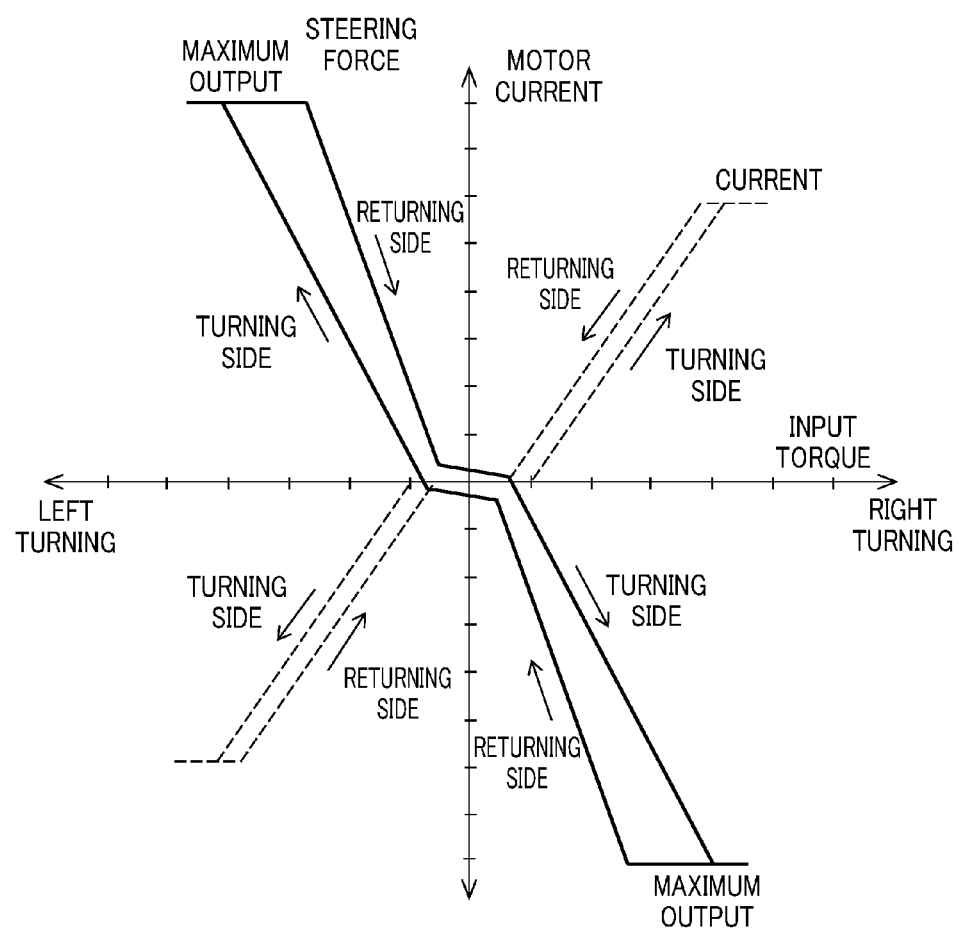
FIG. 5A is a thrust characteristic diagram of the electric power steering device according to the embodiment of the present invention.

FIG. 5A is an ideal thrust characteristic diagram showing a relationship of an input torque applied to the input shaft 11 by the actuator 51, a motor current and a steering force.

As shown by broken line in FIG. 5A, a flowing direction of a motor current is reversed according to a right turning direction and a left turning direction of the steering wheel. The motor current is kept substantially at zero when the input torque is not larger than a predetermined value, and is set to increase in proportion to the input torque when the input torque increases above the predetermined value. A steering force increases and decreases as shown by solid line in FIG. 5A according to the motor current. Since a torque sensor output has a hysteresis component, the motor current and the steering force respectively have a hysteresis component at turning sides and returning sides of the steering wheel.

Figure 5B:
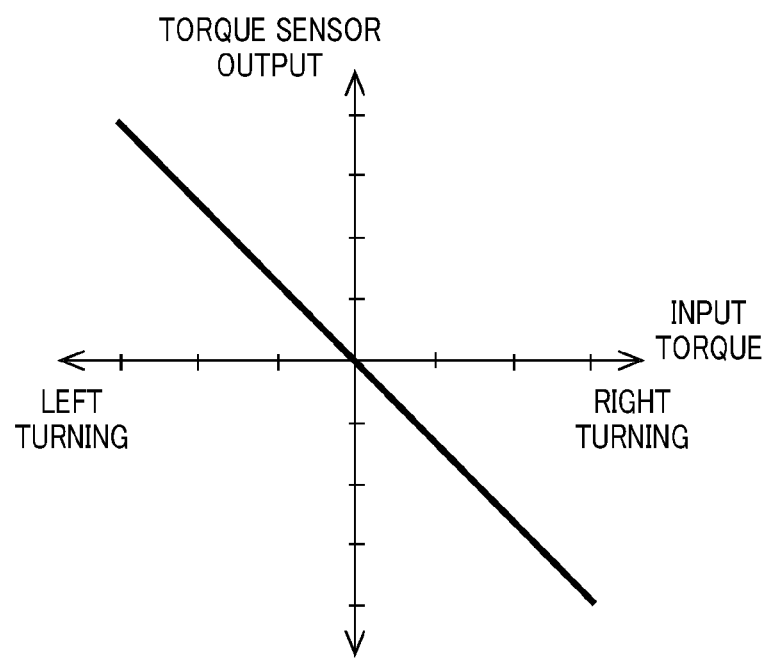
FIG. 5B is an output characteristic diagram of the torque sensor of the electric power steering device according to the embodiment of the present invention.

FIG. 5B is an ideal thrust characteristic diagram showing a relationship of an input torque applied to the input shaft 11 by the actuator 51 and a torque sensor output (torque detection signal of the magnetic sensor 48).

An output of the torque sensor 2 becomes zero when the steering wheel is not steered (when the input torque is zero), and increases as the input torque increases when the steering wheel is steered in the left turning direction while decreasing as the input torque increases when the steering wheel is steered in the right turning direction. Actually, at a turning side toward which the steering wheel is laterally turned and at a returning side toward which the steering wheel is returned in an opposite direction, the torque sensor output has a hysteresis component which increases and decreases according to a torsion angle of the torsion bar 21. This hysteresis component is produced by magnetic forces remaining in the rotating magnetic circuit unit 25 and the fixed magnetic circuit unit 31 made of soft magnetic bodies.

Figure 6A:
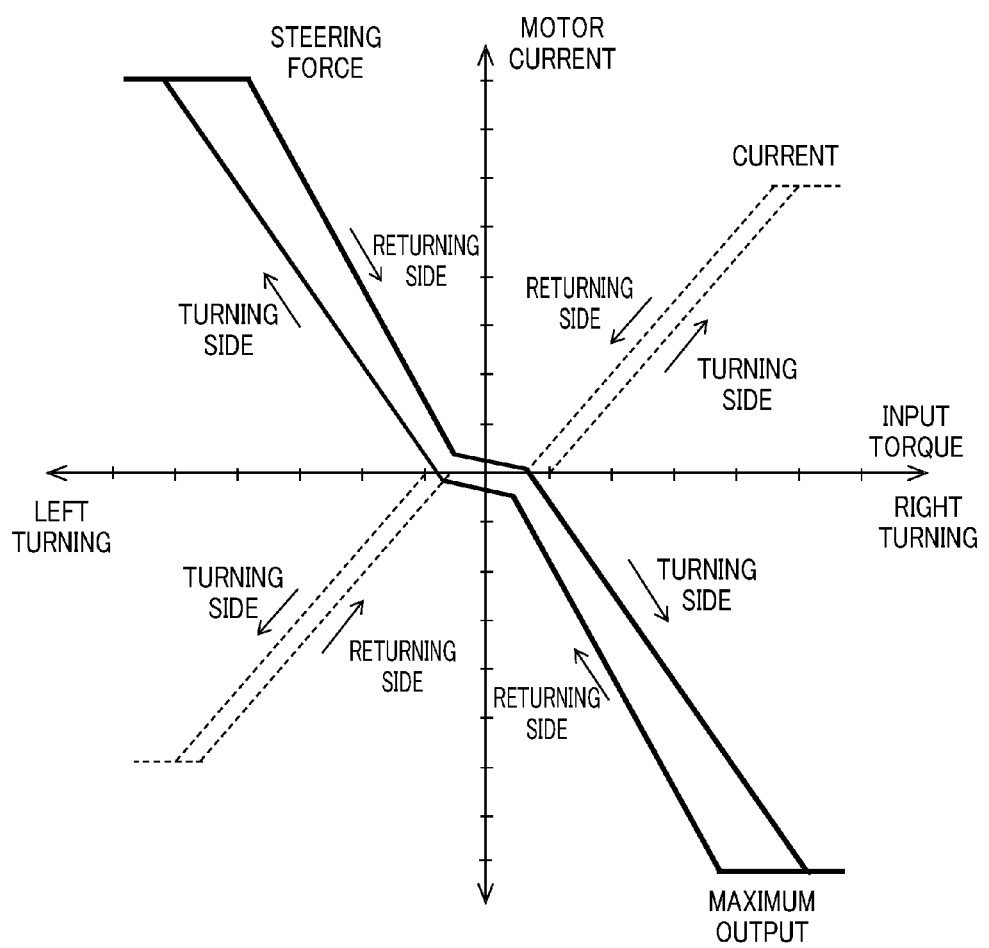
FIG. 6A is a thrust characteristic diagram of the electric power steering device according to the embodiment of the present invention.
Figure 6B:
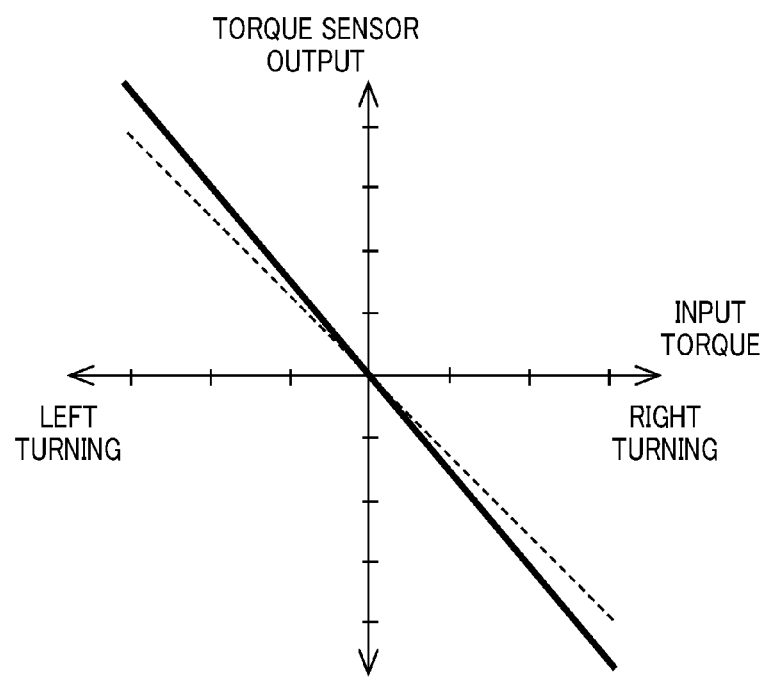
FIG. 6B is an output characteristic diagram of the torque sensor of the electric power steering device according to the embodiment of the present invention.

FIGS. 6A and 6B are characteristic diagrams corresponding to FIGS. 5A and 5B and show characteristics when a change rate of a motor current and a change rate of a steering force deviate. FIG. 6A shows a state where calculated change rate of the motor current and change rate of the steering force are respectively smaller than an ideal value of the change rate of the motor current and an ideal value of the change rate of the steering force set in advance and inclinations become smaller as compared with the characteristics shown in FIG. 5A when the output amplification factor is set at the specified value in the temporary sensor output setting process.

When a process of increasing an output amplification factor is performed in the sensor output adjustment process of Step S6 based on the deviation amount of the steering force calculated in the sensor output calculation process of Step S5, the torque sensor output switches from a characteristic shown by broken line in FIG. 6B to the one shown by solid line, whereby an ideal thrust characteristic is obtained as shown in FIG. 5A.

When the calculated change rate of the motor current and change rate of the steering force respectively become larger than the ideal value of the change rate of the motor current and the ideal value of the change rate of the steering force, a process of reducing the output amplification factor is predetermined in Step S5, whereby the ideal thrust characteristic is obtained.

Figure 7A:
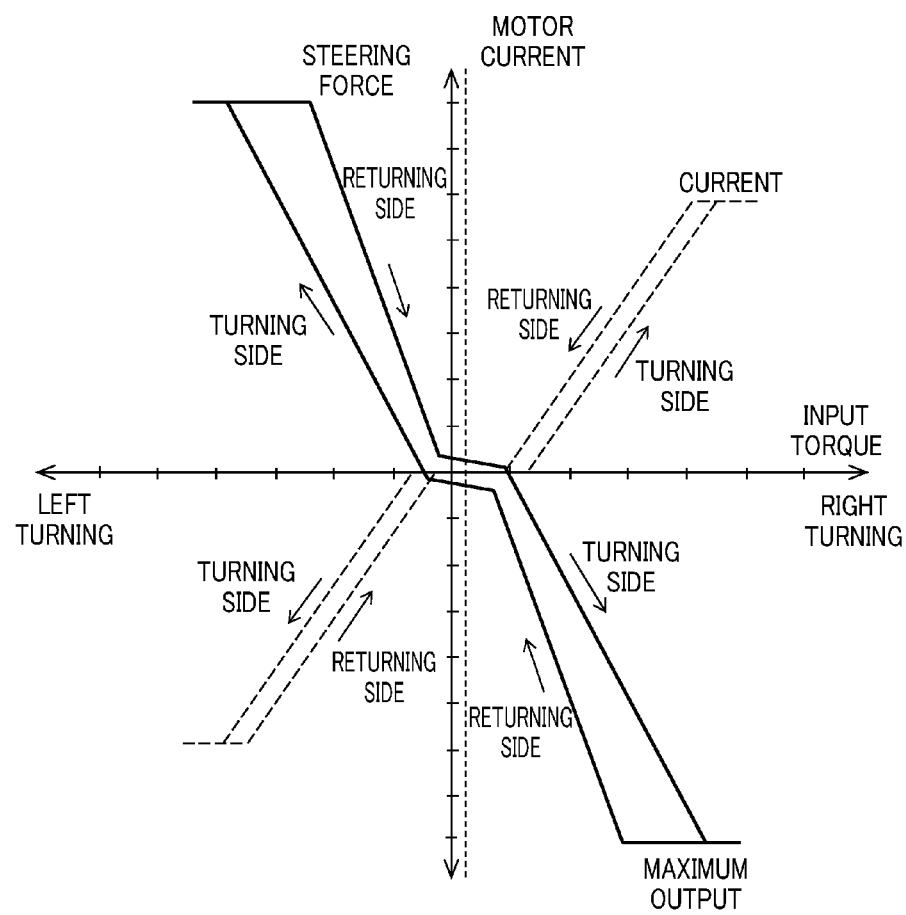
FIG. 7A is a thrust characteristic diagram of the electric power steering device according to the embodiment of the present invention.
Figure 7B:
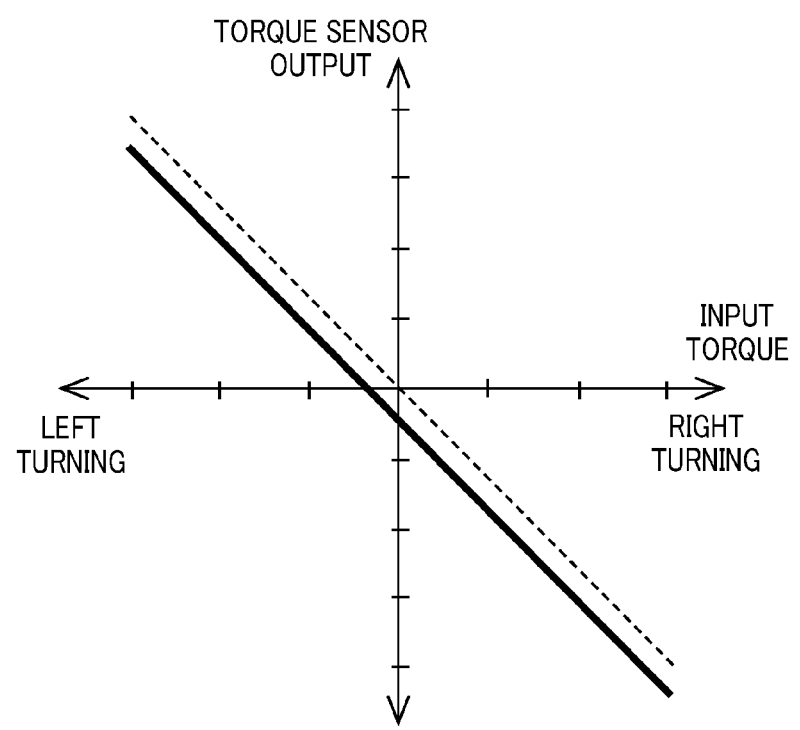
FIG. 7B is an output characteristic diagram of the torque sensor of the electric power steering device according to the embodiment of the present invention.

FIGS. 7A and 7B are characteristic diagrams corresponding to FIGS. 5A and 5B and show characteristics when a motor current and a steering force deviate. FIG. 7A shows a state where the motor current and the steering force respectively deviate from an ideal value of the motor current and an ideal value of the steering force in the right turning direction when the offset value is set at the specified value in the temporary sensor output setting process of Step S2.

When a process of reducing the offset value is performed in the sensor output adjustment process of Step S6 based on the deviation amount of the steering force calculated in the sensor output calculation process of Step S5, the torque sensor output switches from a characteristic shown by broken line in FIG. 7B to the one shown by solid line, whereby the motor current and the steering force come to have the ideal thrust characteristics as shown in FIG. 5A.

When the measured motor current and steering force respectively deviate from the ideal value of the motor current and the ideal value of the steering force in the left turning direction, a process of increasing the offset value is performed in Step S5, whereby the ideal thrust characteristic is obtained.

A break point adjustment to change the output amplification factor in the left turning direction and in the right turning direction to deal with the case where the change rates of the motor current and the steering force differ in the left turning direction and in the right turning direction.

The summary, functions and effects of this embodiment are described below.

This embodiment concerns the adjusting apparatus for the electric power steering device 1. The adjusting apparatus for the electric power steering device 1 includes the steering mechanism 3 for converting an input torque into a steering force and transmitting it to the wheels, the torque sensor 2 for outputting a torque detection signal according to the input torque, the electric motor 4 for applying a steering assist torque according to the torque detection signal output from the torque sensor 2, the sensor circuits being capable of changing the output characteristics of the torque sensor 2, the steering force meter 52 for actuating the electric motor 4 via the torque sensor 2 according to the input torque and measuring the steering force output by the steering mechanism 3, and the sensor output adjuster 54 for adjusting the output characteristics of the sensor circuits to approximate the steering force to the ideal value according to a deviation amount calculated based on a difference between the steering force measured by the steering force meter 52 and an ideal value set in advance.

This embodiment concerns the method for adjusting the electric power steering device 1. The electric power steering device 1 includes the steering mechanism 3 for converting an input torque into a steering force and transmitting it to the wheels, the torque sensor 2 for outputting a torque detection signal according to the input torque, the electric motor 4 for applying a steering assist torque according to the torque detection signal output from the torque sensor 2 and the sensor circuits being capable of changing the output characteristics of the torque sensor 2. The adjusting method successively performs the steering force measurement process of actuating the electric motor 4 via the torque sensor 2 according to an input torque and measuring a steering force output by the steering mechanism 3, the sensor output measurement process of calculating a difference between the measured steering force and an ideal value set in advance as a deviation amount, and the sensor output adjustment process of adjusting the output characteristics of the sensor circuits to approximate the steering force to the ideal value according to the calculated deviation amount.

By the above configuration, the output characteristics of the sensor circuits are adjusted in response to product variations of the constituent elements including the torque sensor 2, the electric motor 4 and the steering mechanism 3. By this, a steering force variation among products of the electric power steering device 1 can be suppressed.

Thus, it is not necessary to make an output adjustment for the torque sensor 2 in a single state and make a thrust adjustment of the electric power steering device 1 by the controller 5 for controlling an output of the electric motor 4 as before, wherefore productivity is improved.

In this embodiment, the torque sensor 2 includes the input torque output unit (detection element) for making an output corresponding to an input torque, the sensor circuit includes the amplification unit for amplifying the output of the input torque output unit by the set output amplification factor, and the sensor output adjustment process adjusts the output amplification factor according to the difference between the steering force measured according to the input torque and the ideal value.

By the above configuration, the change rate of the steering force can be approximated to the ideal characteristic in response to product variations of the constituent elements including the torque sensor 2, the electric motor 4 and the steering mechanism 3.

In this embodiment, the sensor circuit includes the offset value correction unit for adding the offset value to the output of the amplification unit, and the sensor output adjustment process adjusts the offset value according to the difference between the steering force measured according to the input torque and the ideal value.

By the above configuration, a deviation of the steering force with respect to a steering angle is solved in response to product variations of the constituent elements including the torque sensor 2, the electric motor 4 and the steering mechanism 3.

The embodiments of the present invention described above are merely illustration of some application examples of the present invention and not of the nature to limit the technical scope of the present invention to the specific constructions of the above embodiments.

The present application claims a priority based on Japanese Patent Application No. 2010-258093 filed with the Japan Patent Office on Nov. 18, 2010, all the contents of which are hereby incorporated by reference.

The invention claimed is:

1. An adjusting method for an electric power steering device for a vehicle,
the electric power steering device comprising:
a steering mechanism configured to convert an input torque into a steering force and transmit the steering force to wheels of the vehicle, the steering mechanism comprising:
an input shaft configured to receive the input torque applied by a driver of the vehicle;
an output shaft configured to output the steering force;
a torsion bar connecting the input shaft to the output shaft; and
a rack configured to transmit the steering force to the wheels,
a torque sensor configured to output a torque detection signal according to the input torque, the torque sensor comprising a sensor circuit configured to change an output characteristic of the torque sensor;
an electric motor configured to apply a steering assist torque to the steering mechanism; and
a controller configured to control the electric motor to generate the steering assist torque according to the torque detection signal;
wherein the adjusting method comprises successively performing:
a steering force measurement process of measuring the steering force on the basis of a thrust of the rack using a steering force meter coupled to the rack when the steering assist torque of the electric motor is applied to the steering mechanism;
a sensor output calculation process of calculating a difference between the steering force and an ideal value set in advance; and
a sensor output adjustment process of causing the sensor circuit to change the output characteristic of the torque sensor to approximate the steering force to the ideal value according to the difference.

2. The adjusting method for the electric power steering device according to claim 1, wherein:
the torque sensor includes an input torque output unit for making an output corresponding to the input torque;
the sensor circuit includes an amplification unit for amplifying the output of the input torque output unit based on a set output amplification factor; and
the sensor output adjustment process comprises adjusting the output amplification factor according to the difference between the steering force and the ideal value.

3. The method for adjusting the electric power steering device according to claim 2, wherein:
the sensor circuit includes an offset value correction unit for adding an offset value to an output of the amplification unit; and
the sensor output adjustment process comprises adjusting the offset value according to the difference between the steering force and the ideal value.

4. The adjusting method for the electric power steering device according to claim 1, wherein:
the rack has opposite ends, and a middle portion between the opposite ends,
the middle portion of the rack is engaged with a pinion formed on the output shaft, and
the steering force meter is coupled to one of the opposite ends of the rack and measures, in said steering force measurement process, the steering force transmitted from the rack to the wheels.

5. The adjusting method for the electric power steering device according to claim 1, further comprising:
during said steering force measurement process of measuring the steering force transmitted from the rack to the wheels,
connecting the torque sensor to the controller,
disconnecting the torque sensor from an input of the sensor output adjuster, and
disconnecting the torque sensor from an output of the sensor output adjuster;
during said sensor output calculation process,
disconnecting the torque sensor from the controller,
connecting the torque sensor to the input of the sensor output adjuster, and
disconnecting the torque sensor from the output of the sensor output adjuster; and
during said sensor output adjustment process,
disconnecting the torque sensor from the controller,
disconnecting the torque sensor from the input of the sensor output adjuster, and
connecting the torque sensor to the output of the sensor output adjuster.

6. An electric power steering device for a vehicle, comprising:
a steering mechanism configured to convert an input torque into a steering force and transmit the steering force to wheels of the vehicle, the steering mechanism comprising:
an input shaft configured to receive the input torque applied by a driver of the vehicle;
an output shaft configured to output the steering force;
a torsion bar connecting the input shaft to the output shaft; and
a rack configured to transmit the steering force to the wheels;
a torque sensor configured to output a torque detection signal according to the input torque;
an electric motor configured to apply a steering assist torque to the steering mechanism;
a controller configured to control the electric motor to generate the steering assist torque according to the torque detection signal;
a sensor circuit provided in the torque sensor and configured to change an output characteristic of the torque sensor;
a steering force meter coupled to the rack and configured to, when the steering assist torque of the electric motor is applied to the steering mechanism, measure the steering force transmitted from the rack to the wheels on the basis of a thrust of the rack; and
a sensor output adjuster configured to cause the sensor circuit to change the output characteristic of the torque sensor to approximate the steering force to an ideal value set in advance, according to a difference between the steering force and the ideal value.

7. The electric power steering device according to claim 6, wherein:
the torque sensor includes an input torque output unit for making an output corresponding to the input torque;
the sensor circuit includes an amplification unit for amplifying the output of the input torque output unit based on a set output amplification factor; and
the sensor output adjuster is configured to adjust the output amplification factor according to the difference between the steering force and the ideal value.

8. The electric power steering device according to claim 7, wherein:
the sensor circuit includes an offset value correction unit for adding an offset value to an output of the amplification unit; and
the sensor output adjuster is configured to adjust the offset value according to the difference between the steering force and the ideal value.

9. The electric power steering device according to claim 6, wherein:
the rack has opposite ends, and a middle portion between the opposite ends,
the middle portion of the rack is engaged with a pinion formed on the output shaft, and
the steering force meter is coupled to one of the opposite ends of the rack to measure the steering force transmitted from the rack to the wheels.

10. The electric power steering device according to claim 6, further comprising:
a first switch disposed in a connection between the torque sensor and the controller;
a second switch disposed in a connection between the torque sensor and an input of the sensor output adjuster; and
a third switch disposed in a connection between the torque sensor and an output of the sensor output adjuster.

11. The electric power steering device according to claim 10, wherein:
when the steering force meter measures the steering force transmitted from the rack to the wheels, the first switch is configured to be turned ON and the second and third switches are configured to be turned OFF,
when the torque detection signal is measured, the second switch is configured to be turned ON and the first and third switches are configured to be turned OFF, and
when the sensor output adjuster outputs a signal to the torque sensor to cause the sensor circuit to change the output characteristic of the torque sensor, the third switch is configured to be turned ON and the first and second switches are configured to be turned OFF.

* * * * *